(12) United States Patent
Volkmann (10) Patent No.: US 8,967,422 B2
(45) Date of Patent: Mar. 3, 2015

(54) MULTILEVEL SHEET METAL CONTAINER WITH OUTWARDLY BEADED END FACES

(71) Applicant: Volkmann GmbH, Soest (DE)

(72) Inventor: Thilo Volkmann, Soest (DE)

(73) Assignee: Volkmann GmbH, Soest (DE)

( * ) Notice: Subject to any disclaimer, the term of this patent is extended or adjusted under 35 U.S.C. 154(b) by 0 days.

(21) Appl. No.: 14/158,522

(22) Filed: Jan. 17, 2014

(65) Prior Publication Data

US 2014/0131349 A1    May 15, 2014

Related U.S. Application Data

(63) Continuation of application No. 12/148,429, filed on Apr. 18, 2008, now abandoned, which is a continuation of application No. 10/844,827, filed on May 13, 2004, now abandoned.

(30) Foreign Application Priority Data

May 14, 2003  (DE) .............................. 203 07 555 U (51) Int. Cl.
  *B65D 6/28*    (2006.01)
(52) U.S. Cl.
  USPC ........................... 220/687; 220/686; 220/4.26
(58) Field of Classification Search
  USPC ........... 285/55, 110; 277/612; 220/4.07, 4.01,
                                  220/4.26, 4.27, 687, 686, 683
  See application file for complete search history.

(56) References Cited

U.S. PATENT DOCUMENTS

| | | |
|---|---|---|
| 1,043,412 A | 11/1912 | Faunce |
| 1,863,122 A | 6/1932 | Matthews |
| 2,685,964 A | 8/1954 | Brown |
| 2,761,707 A | 9/1956 | Herman |
| 2,769,648 A | 11/1956 | Herman |
| 2,920,810 A | 1/1960 | Dueringer |
| 3,178,206 A | 4/1965 | Martin et al. |

(Continued)

FOREIGN PATENT DOCUMENTS

| | | |
|---|---|---|
| CH | 13389 A | 6/1897 |
| DE | 826874 C | 1/1952 |

(Continued)

*Primary Examiner* — Stephen Castellano
(74) *Attorney, Agent, or Firm* — Rankin, Hill & Clark LLP (57) ABSTRACT

A multilevel container having a circumferentially continuous wall or bottom elements of sheet metal with radially outwardly beaded end faces. The wall and bottom elements are placed on top of each other on butt joints so as to seal the end faces and are detachably braced with a minimum of one neighboring container level. The multilevel container also comprises one or more sealing rings and bracing components that act on neighboring end faces. In order to provide a readily manufacturable and form a stable multilevel container without multiple beads in alternating directions or weldings in the butt joint portions, a separate and independent shape retaining ring is provided. This ring reinforces the container and has shape retaining surfaces on its two end faces. In the region of their end faces, the neighboring wall and bottom elements are set on and tightly braced against the shape retaining surfaces of the reinforcing shape retaining ring. Radially inside or radially outside the reinforcing shape retaining ring, a separate sealing ring is inserted between the radially outwardly beaded sheet metal end faces of the neighboring bottom or wall elements of the multilevel container or between these end faces and the reinforcing shape retaining ring.

19 Claims, 6 Drawing Sheets

(56) References Cited

U.S. PATENT DOCUMENTS

| | | |
|---|---|---|
| 3,193,129 A | 7/1965 | Pfluger et al. |
| 3,212,798 A | 10/1965 | Lewis et al. |
| 3,343,812 A | 9/1967 | Moulton |
| 3,669,474 A | 6/1972 | Bode |
| 4,228,575 A | 10/1980 | Wiltshire et al. |
| 5,560,656 A * | 10/1996 | Okamura et al. ............... 285/55 |
| 7,914,053 B2 | 3/2011 | Keller et al. |

FOREIGN PATENT DOCUMENTS

| | | |
|---|---|---|
| DE | 1716260 U | 2/1956 |
| DE | 2452857 A1 | 5/1975 |
| DE | 2731603 A1 | 2/1979 |
| DE | 8810118 U1 | 9/1988 |
| DE | 4009659 A1 | 10/1990 |
| DE | 4316522 A1 | 11/1994 |
| GB | 490201 A | 8/1938 |

* cited by examiner

MULTILEVEL SHEET METAL CONTAINER WITH OUTWARDLY BEADED END FACES

This application claims priority to and the benefit of U.S. application Ser. No. 12/148,429, filed Apr. 18, 2008. This application is a continuation of U.S. application Ser. No. 12/148,429, Apr. 18, 2008, now abandoned which is a continuation of U.S. application Ser. No. 10/844,827, filed May 13, 2004, now abandoned, which application claims priority to and the benefit of German Application No. 20307555.2, filed May 14, 2003, which applications are incorporated herein by reference in their entirety.

FIELD OF THE INVENTION

The subject matter of the present invention relates to a multilevel sheet metal container with outwardly beaded end faces. The container utilizes a unique sealing configuration and sealing ring between container levels or regions.

BACKGROUND OF THE INVENTION

To meet the requirements of different container sizes or the requirements of containers with changeable bottom or wall elements, it is customary in the case of multilevel containers to ensure the stability of the container in the butt joint region by means of an appropriately robustly designed bracing ring (German Patent DE U1 88 10 118). Between the bracing ring and the outwardly beaded end faces of the container wall or bottom elements, elastic sealing rings are inserted into the butt joints. An elastic sealing ring or one of the lips of a multisegmented elastic sealing ring is inserted in the area between the facing end faces of the outwardly beaded sheet metal of which the bottom and wall elements are made. While the bracing ring and the radially outwardly beaded end faces can be in direct contact with each other, the sealing ring between the radially outwardly beaded end faces facing each other, however, cannot be omitted.

To increase the stability along the butt joint, a supporting ring which is located on the inside and which partially straddles the two neighboring container walls can be used (German Patent DE A1 40 09 659).

Multilevel containers made of sheet metal are known in which the butt joints are reinforced with massive flanges. These flanges are welded to the circumference of the container wall. Compared to these known containers, the generic multilevel containers with beaded end faces have the advantage that they can be produced much less expensively.

To provide the butt joints of this design with sufficient stability, however, the conventionally known beaded areas are reinforced in a bridge-like manner by means of multiple beads in alternating directions. Among other things, these reinforcements have the disadvantage that they form grooves in which the material stored in the container can be trapped. For reasons of hygiene, this is undesirable, especially in food and pharmaceutical applications.

SUMMARY OF THE INVENTION

Based on these considerations, the problem to be solved by the present invention is to provide a generic multilevel container so as to be robust, but without flanges that need to be welded onto the butt joints, so that no beading folds or grooves can form in which the material stored in the container can be trapped or accumulated.

To solve this problem, a multilevel container having certain features is provided. Specifically, the present invention provides a separate and independent shape retaining ring which reinforces the container. The shape retaining ring has on both of its end faces, shape-retaining surfaces with which the neighboring wall and bottom elements that are made of container sheet metal are reinforced directly in the area of their radially outwardly beaded end faces. One or a plurality of additionally disposed sealing ring(s) is (are) separately braced radially inside or radially outside of the reinforcing shape-retaining ring between the outwardly beaded end faces (made of sheet metal) of the neighboring bottom or wall elements of the multilevel container or (individually) between these end faces and the reinforcing shape-retaining ring.

The present invention provides a readily producible and simply constructed multilevel container in which the neighboring bottom and wall elements are connected to each other by means of a direct, in particular metal, contact. While ensuring high stiffness, the invention also provides for a lightweight construction and modular design. In the container surface area which comes into contact with the product contained therein, in particular along the butt joints, dead spaces can be eliminated or avoided. This ensures that relatively high and in many instances, the highest, hygiene requirements are met. In addition, this configuration promotes easy cleaning of the container and its interior surfaces. Furthermore, the present invention avoids the broader problems arising with the known multilevel, i.e., modularly designed, containers, such as electrostatic charges and shear deformation of seals during operation under a vacuum, as well as shape-retaining problems caused by an uneven distribution of the load on the collets and centering problems. Since in the stacking joint design according to the present invention the end faces of the neighboring container wall and bottom elements are made of the same sheet metal, of which the container jacket and container bottom are made, i.e., of sheet metal with a wall thickness of less than about 10 mm, and especially less than 4 mm, it is easy and efficient to manufacture the modules. Due to the use of a separate and independent shape-retaining ring with shape-retaining surfaces on the end faces which reinforces the container, the unavoidably present tolerances during sheet metal forming (beading) are not critical, and a precise stacking height can be maintained. This stacking height does not alter even when excess and reduced pressure is applied. Accordingly, the container is stable in height and length.

The separate and independent shape-retaining ring provides shape-retaining end faces which reinforce the container. The shape retaining ring exerts its supporting function especially along the radially outwardly beaded flanges on the end faces of the preferably circumferentially continuous bottom or wall elements of the multilevel container. The shape retaining ring can be manufactured by either metal cutting from solid or tubular material or by any molding or casting technique or die-casting technique with or without a mechanical aftertreatment. Materials to be considered, in addition to metal and metal alloys, are synthetics with or without reinforcements. On the shape-retaining ring which reinforces the container, especially radially along the inside, it is possible to attach built-in components, such as funnels, filter plates, closing or separating elements and many others.

In the region running radially on the outside, the radially outwardly beaded flange region on the end faces of neighboring bottom or wall elements can be fitted with collar-like reinforcement bridges which surround the wall or bottom element and which are also formed by beading the sheet metal of the container.

With respect to size, shape, material selection and technical design, the previously mentioned components to be used according to the present invention are described in the practical examples below. These aspects are not subject to any particular conditions so that the selection criteria conventionally used in the field in which components are applied can be used without restriction.

Additional details, features and advantages of the subject matter of the present invention follow from the claims and from the description below of the associated drawings which, by way of an example, show preferred practical examples of the multilevel container of sheet metal that is outwardly beaded on the end face in accordance with the present invention.

BRIEF DESCRIPTION OF THE DRAWINGS

In the drawings,

FIGS. 2A through 2D show a vertical section of portions of a butt joint of neighboring container elements with radially outwardly located profile sealing rings, with FIG. 2A showing a basic embodiment of the reinforcing shape retaining ring, FIG. 2B showing the shape retaining ring with a welded on filter plate, FIG. 2C showing the shape retaining ring with an inserted funnel (welding joint not shown), and FIG. 2D showing the shape retaining ring with the filter plate inserted but not welded on;

DETAILED DESCRIPTION OF THE PREFERRED EMBODIMENTS

Figure 1A:
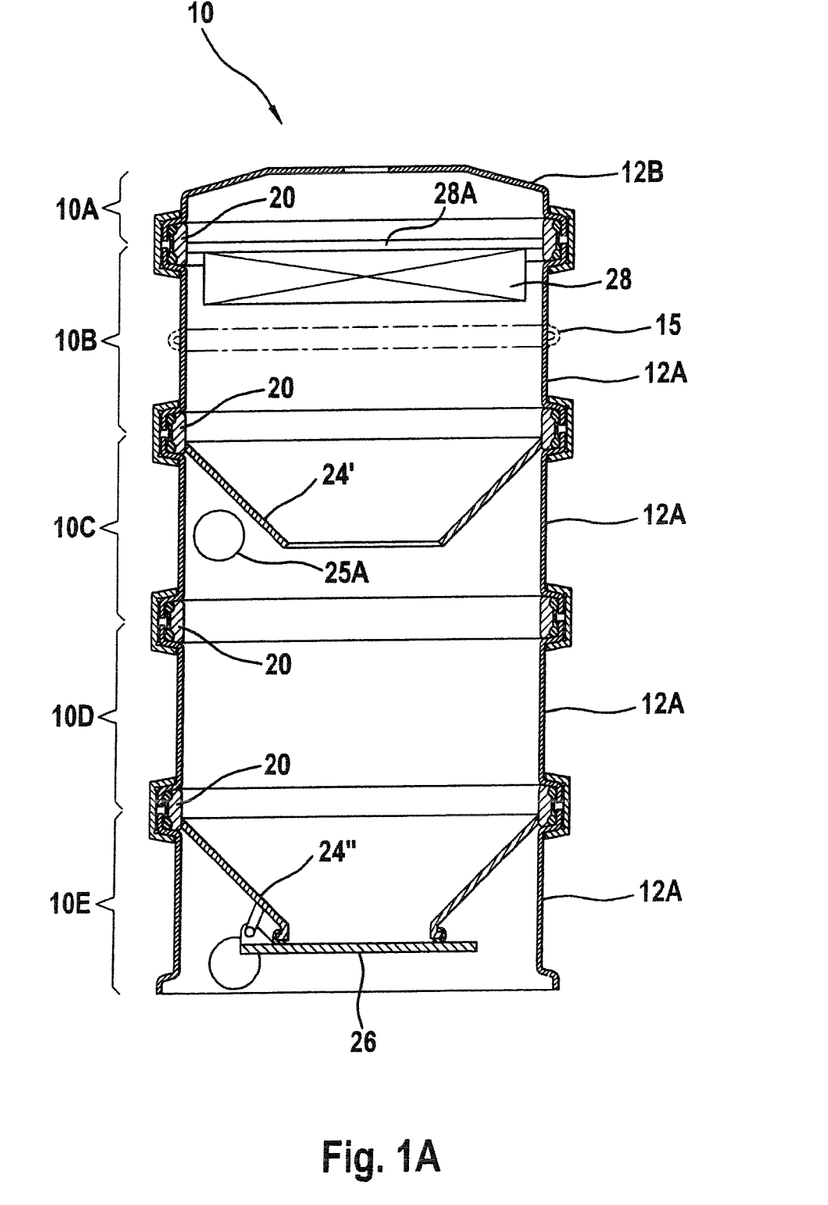
FIG. 1A shows a first embodiment of a multilevel container comprising one upper bottom element and four wall elements in a schematic axial section view.

The five level container 10 with container levels 10A through 10E shown in FIG. 1A comprises four identical cylindrical, circumferentially continuous wall elements 12A and a pot-like bottom element 12B on its upper end. The lowermost wall element 12A serves merely as a supporting stand for mounting a discharge funnel 24" which, on its tapered end, supports a throttle valve 26. Both this lower funnel 24" as well as funnel 24' located higher up and filter element 28 are supported on the radial inside surface of one shape retaining ring each. The funnels and the filter element can be continuously connected along the circumference to shape retaining ring 20 as described below, e.g., by means of welding. The butt joints of container levels 10A through 10E are designed as shown in greater detail in FIGS. 2A through 2D and will be described below on the basis of FIG. 2A.

As FIG. 1A also shows, it is possible to provide container level 10C which serves as a cyclone so as to cause a coarse separation of the conveying fluid and the material conveyed. The cyclone element 24' used for this purpose is circumferentially continuously connected, in particular welded, to a shape retaining ring 20 as is described below. If relatively long filter candles are used, level 10B can be designed so as to be higher then container level 10C. Due to the height of the discharge unit, this also applies to a potentially higher container level 10A. Thus, to radially reinforce the container levels, in particular 10B and 10A, these can be provided with circumferentially continuous crimps 15 which are formed in one piece from the material of wall element 12A.

Figure 1B:
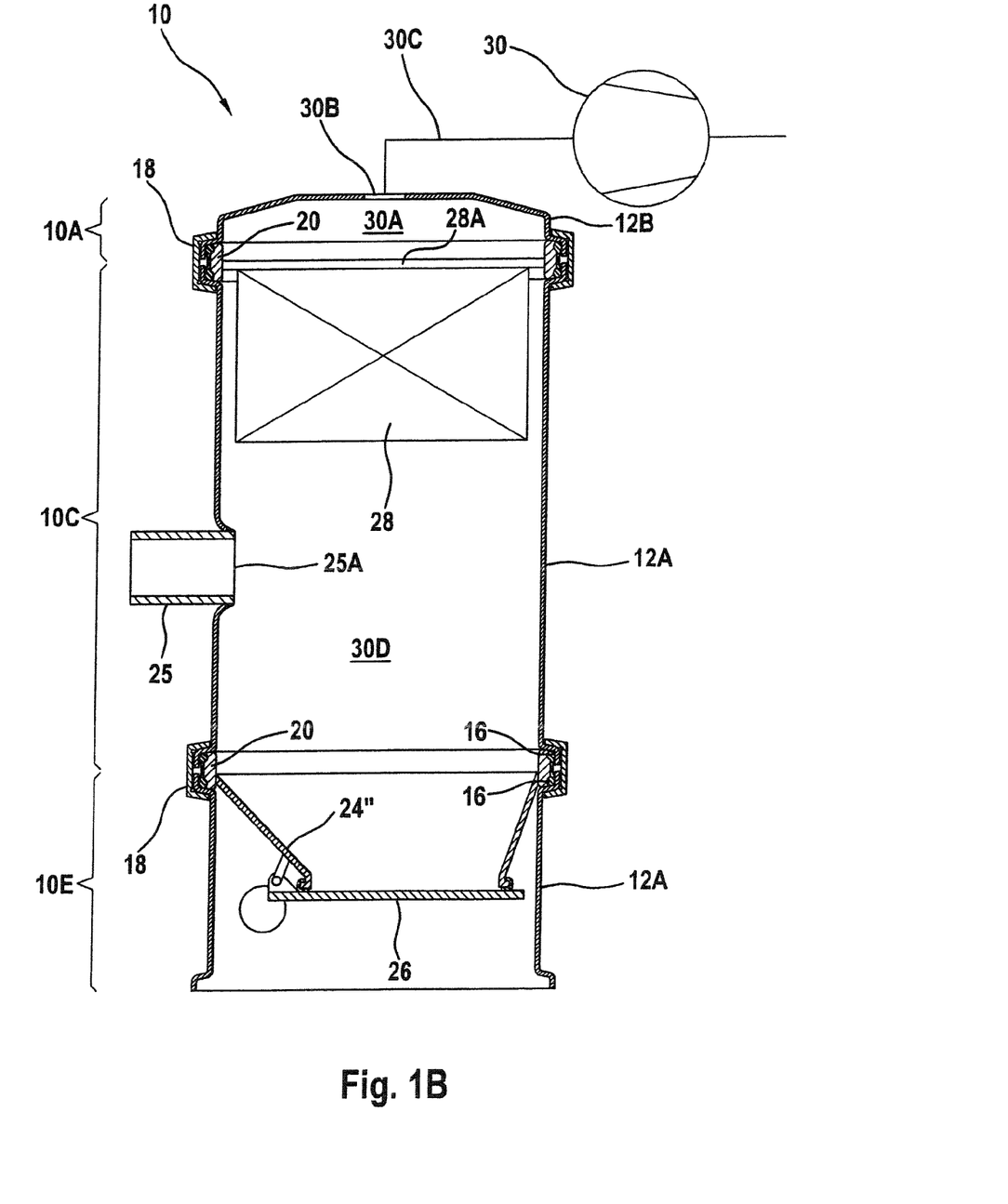
FIG. 1B shows a second embodiment of a multilevel container comprising one upper bottom element and two wall elements in an axial section view.

FIG. 1B shows another example of the diverse modular configuration of multilevel containers according to the present invention.

It can be seen from FIG. 1B that filter plate 28A holds a filter generally identified by reference numeral 28 and that the filter plate is connected in a circumferentially sealing fashion to shape retaining ring 20A, which will be described below, so that above filter plate 28A, a suction chamber 30A forms in bottom element 12B, which suction chamber is fluidically connected via a suction opening 30B and suction line 30C to vacuum pump 30 and is fitted with conventional seals. Because of the permeability of filter 28 to fluids, a vacuum is generated in the intermediate storage space 30D located underneath filter 28 when vacuum pump 30 operates and throttle valve 26 of discharge funnel 24" is closed. The vacuum can be extended by conventional means via outlet opening 25A provided in wall element 12A and an associated, preferably tangentially disposed intake stub 25 into a storage space (not shown) for material to be conveyed. This type of basic configuration of an intermittently operating vacuum conveying device is actually known. The circumferential butt joints of the jacket surface of the neighboring container levels 10A, 10C and 10E can be designed in a manner described with reference to the following figures (beginning with FIG. 2).

As an alternative, vacuum pump 30 can be disposed in a conventional manner directly on the upper bottom element 12B. Filter element 28 can be so called filter candles which can be attached to and suspended in a conventional manner from filter plate 28.

Figure 2A:
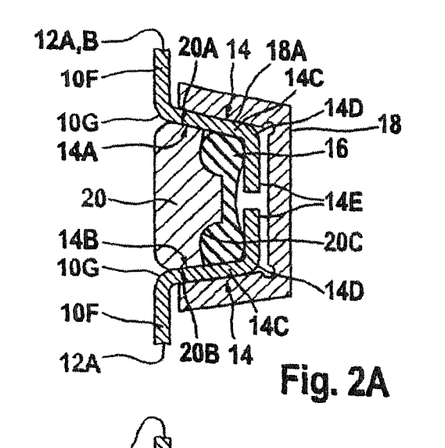
Figure 2B:
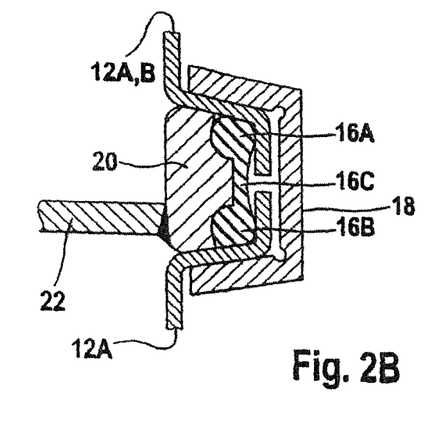
Figure 2C:
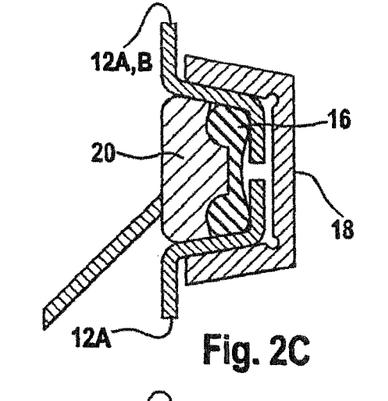
Figure 2D:
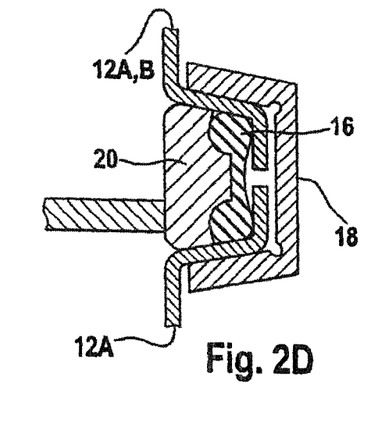
Figure 3A:
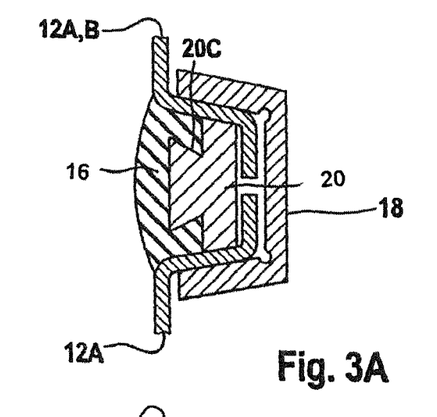
FIGS. 3A and 3B show a different embodiment of the shape retaining ring with a dovetail configuration for mounting a profile sealing ring that is located inside, with FIG. 3A showing a basic form and FIG. 3B showing an embodiment with a reinforcing element for a funnel mount that is formed by the sealing ring.
Figure 3B:
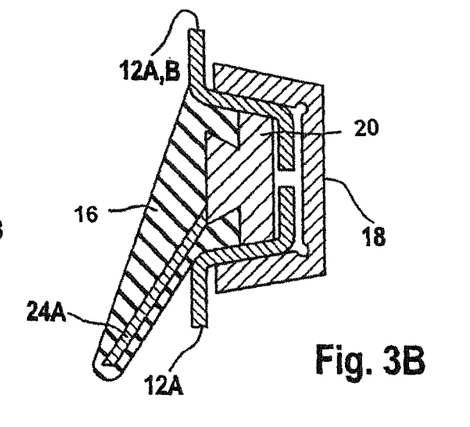
Figure 4:
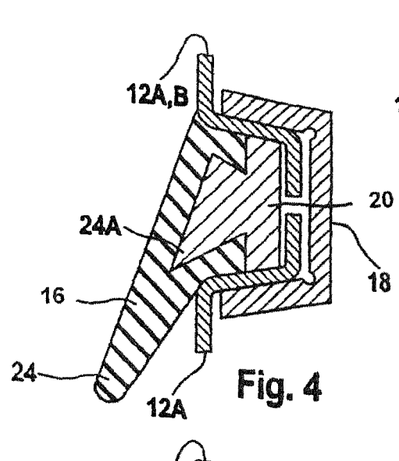
FIG. 4 shows a modification of the shape retaining ring according to FIGS. 3A and 3B, with a collar for supporting a profile seal designed in a funnel like shape.
Figure 5:
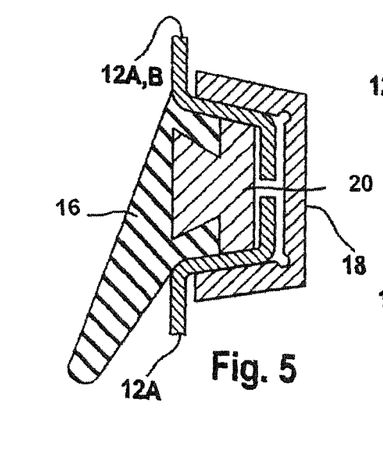
FIG. 5 shows another alternative of a shape retaining ring with a dovetail design in an embodiment in which the diameter is reinforced.

As can be seen from FIGS. 2A through 2C, wall elements 12A and bottom element 12B are made in one piece from sheet metal with a wall thickness of approximately 1 to 4 mm by means of a conventional forming process, such as roll forming, in the course of which beaded end faces 14 are manufactured which have lower (14A) and upper (14B) end faces as contact surfaces. On the end faces of the container levels, starting from circumferential container wall 10F, there is a bent region 10G which is followed by a beaded end face 14 in the form of a flange 14C in the shape of a slightly tapering truncated cone. This flange can end radially outwardly in a truncated fashion as, e.g., shown in FIGS. 7B and 11A and 11B, or be extended so as to form another bent region 14D which, relative to bent region 10G, turns in the opposite direction and which is followed by a reinforcement bridge 14E that runs approximately parallel to the container. In the practical example shown in FIG. 2A, these reinforcement bridges 14E are oriented toward one another, leaving a space gap in between.

A separate and independent solid circumferentially continuous shape retaining ring 20 which reinforces the container and which is a metal ring manufactured by means of metal cutting is inserted on the butt joint between the end faces so that in the region of flanges 14C, the upper and lower beaded end faces 14A and 14B of the neighboring container walls are supported across the entire surface by the associated shape retaining surfaces 20A, 20B on the end faces of shape retaining ring 20. In bent region 10G, shape retaining ring 20 here shown is designed so as to curve into the opposite direction, thus ensuring that minor variations in the dimensions potentially present in bent region 10G do not have a negative impact. The inside diameter of shape retaining ring 20 is selected to ensure that it conforms to the inside diameter of the container. On its radial outer surface, shape retaining ring 20 has upper and lower seal mounts 20C for mounting a symmetrically designed circumferential sealing ring 16, with sealing ring 16 comprising upper and lower sealing ridges 16A and 16B as well as a connecting bridge 16C (FIG. 2B). Sealing ring 16 is dimensioned so that it is positioned close to and seals the two end faces 14A and 14B of flanges 14C, on the one hand, and supports itself in seal mounts 20C of shape retaining ring 20 and (radially on the outside) against each of the reinforcement bridges 14E.

The shape retaining ring 20 and end faces 14A and 14B of the neighboring container elements, which end faces are adjacent to the shape retaining surfaces of the shape retaining ring, are preferably in direct contact and tightly braced against each other. This is preferably achieved by using a bracing ring 18. Although a bracing ring 18 is generally described herein, the various sealing embodiments can employ any similar type of bracing component. In the practical examples shown in FIGS. 2A through 2C, bracing surfaces 18A are positioned flat on the oppositely facing flange surfaces of neighboring container elements. Thus, they are designed with the same slope as flanges 14C and shape retaining surfaces 20A and 20B, i.e., they have a slightly conically truncated shape. Radially outwardly, bracing ring 18 and reinforcement bridge 14E form a space gap so as to allow the bracing forces to take effect in a conventional manner.

Thus, shape retaining ring 20, with its shape retaining surfaces 20A and 20B, exerts functions that reinforce the container elements, without the necessity to reinforce the end faces of the container elements as such by means of multiple forming, which is necessary in conventional containers. As a result, the container is both radially and axially extremely well reinforced and, in addition, protected against torsion, and the manufacture and assembly of the wall and bottom elements is very simple and efficient. At the same time, the shape retaining ring 20 safeguards the radially externally and internally located circumferential seal which utilizes the bracing forces of the bracing ring to exclusively generate the sealing function but not to transmit retaining forces between the neighboring container elements. Because of the simply designed shape and the insertion of the shape retaining ring between the beaded areas, undesirable zones in which material contained in the container can be trapped are avoided in a simple fashion.

Unless already otherwise stated in the brief description of the figures, practical examples 3A through 11B below differ from the practical example shown in FIGS. 2A through 2C as follows.

The dovetailed, radially internal designs of the shape retaining rings according to FIGS. 3A through 5 make it possible to form fittingly mount internally located sealing rings 16. These figures illustrate the shape retaining ring defining one or more recessed regions or undercuttings. Preferably, these undercuttings exhibit a dovetail profile. Reinforcements 24A can be welded onto the shape retaining rings 20 (FIGS. 3B and 4) or be made in one piece with the shape retaining rings 20 (FIG. 4), so as to reinforce extensions that project radially into the container, such as funnel shaped lips of the sealing ring, i.e. forming funnel 24.

Figure 6A:
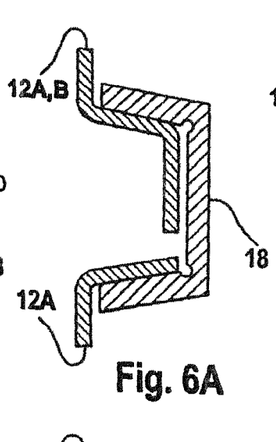
FIGS. 6A through 6C show three different embodiments of the beaded end faces of neighboring container or bottom elements, with FIG. 6A providing a short and FIG. 6C a long one sided collar and with FIG. 6B providing maze like overlapping collars on both sides.
Figure 6B:
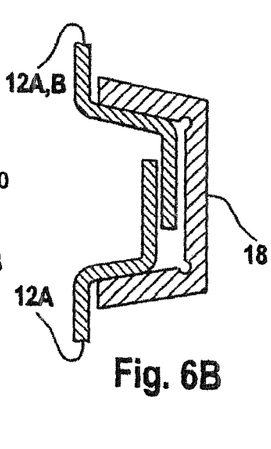
Figure 6C:
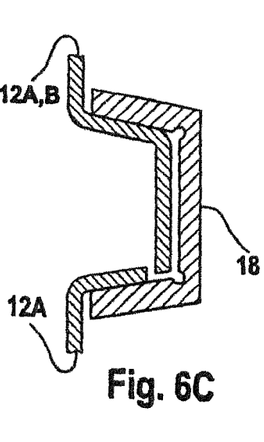

FIGS. 6A through 6C show three different embodiments of the beaded end faces of neighboring container or bottom elements 12A, 12B, with FIG. 6A providing a short one-sided collar configuration and FIG. 6C a long one-sided collar configuration and with FIG. 6B providing maze-like overlapping collars on both sides.

Figure 7A:
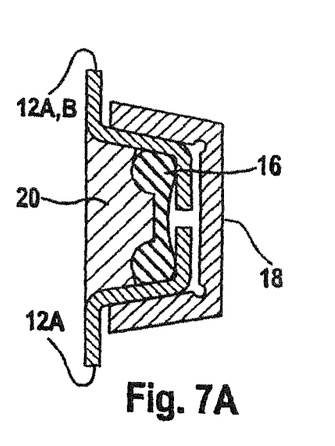
FIGS. 7A and 7B show a shape retaining ring with contour surfaces which, up to the bent regions, conform to the metal beading, with FIG. 7A showing container/bottom elements with collars on both ends and FIG. 7B showing said elements without collars.
Figure 7B:
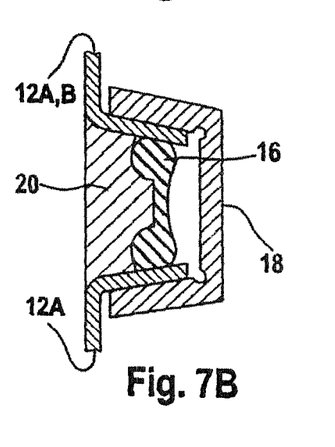

The deposition of contaminants in the seal or joint region is consistently avoided especially since the shape retaining ring has a profile that also conforms to the beading curvature, as seen in FIGS. 7A and 7B. Alternatively, a radially internally located sealing ring such as in FIG. 3A—can be disposed close to bent region 10G even in cases of inferior accuracy to size, which is an especially simple solution.

Figure 8:
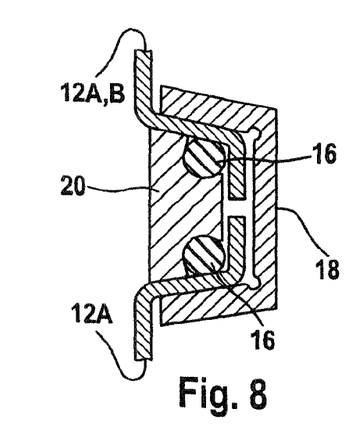
FIG. 8 shows a shape retaining ring with separate mounts on both ends for one sealing ring each.

FIG. 8 shows a shape retaining ring 20 with separate mounts or recessed regions on both ends for one sealing ring 16 each.

Figure 9A:
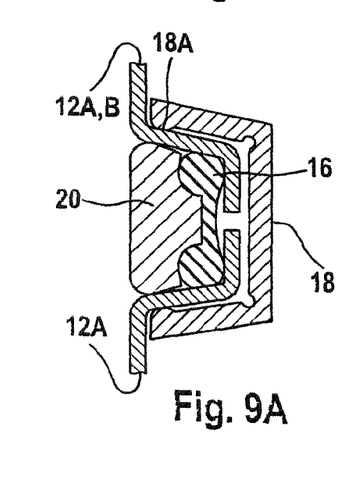
FIGS. 9A through 9C show a shape retaining ring with radii on the end face and with different slopes of the end faces of the shape retaining ring and the container end faces so as to be able to exert increased clamping forces, with the clamping surfaces of the bracing rings in FIG. 9A being radially located far inside, in FIG. 9B being distributed over a large radius, and in FIG. 9C being radially located far outside.
Figure 9B:
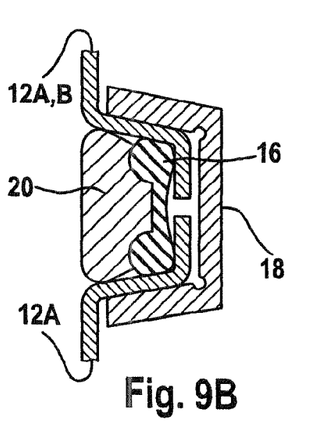
Figure 9C:
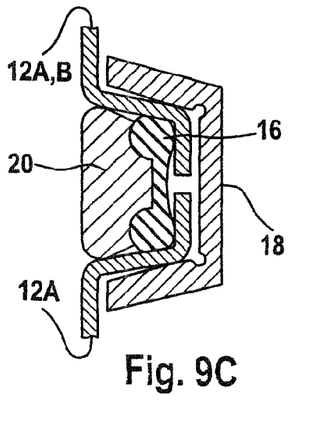

FIGS. 9A through 9C show a shape retaining ring 20 with radii or rounded end regions on the end face(s) and with different slopes of the end faces of the shape retaining ring and the container end faces so as to be able to exert increased clamping forces. That is, the contacting surfaces of the shape retaining ring 20 wall elements 12A, 12B, are not parallel with each other. In addition, the clamping surfaces, or rather contacting surfaces, of the bracing rings 18 in FIG. 9A are located radially far inside, in FIG. 9B are distributed over a large region, and in FIG. 9C are located radially far outside.

Figure 10:
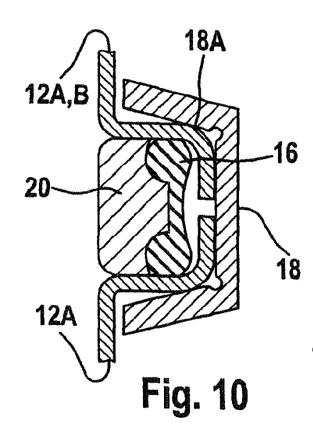
FIG. 10 shows a bracing ring with clamping surfaces radially located far outside.

FIG. 10 shows a bracing ring 18 with clamping surfaces radially located far outside.

Figure 11A:
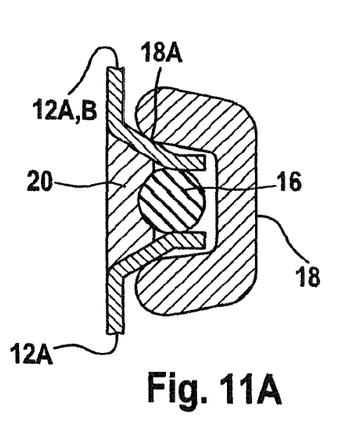
FIGS. 11A and 11B show a shape retaining ring with a conforming end face profile (similar to FIGS. 7A and 7B), but for the attachment of one single outwardly located sealing ring.
Figure 11B:
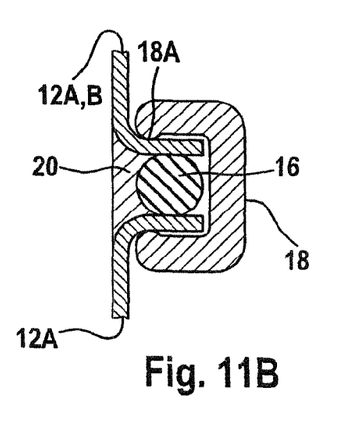
Figure 12A:
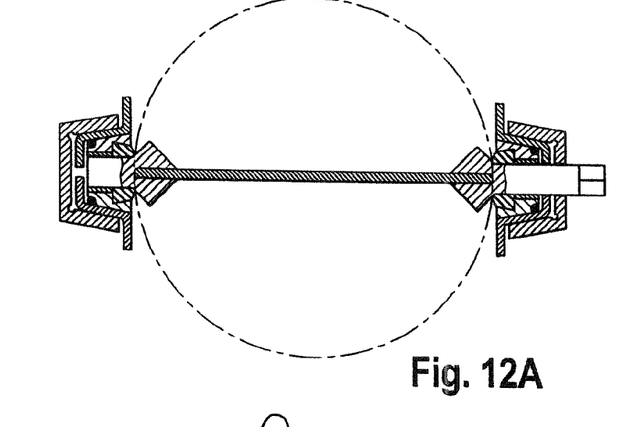
FIGS. 12A through 12D show a two part shape retaining ring with a disk valve (discharge flap), with FIG. 12A showing a section through the disk valve along the axis of rotation, FIG. 12B showing an enlarged detail of FIG. 12A, FIG. 12C showing a section at right angles to the axis of rotation, and FIG. 12D showing an enlarged detail of FIG. 12C.
Figure 12B:
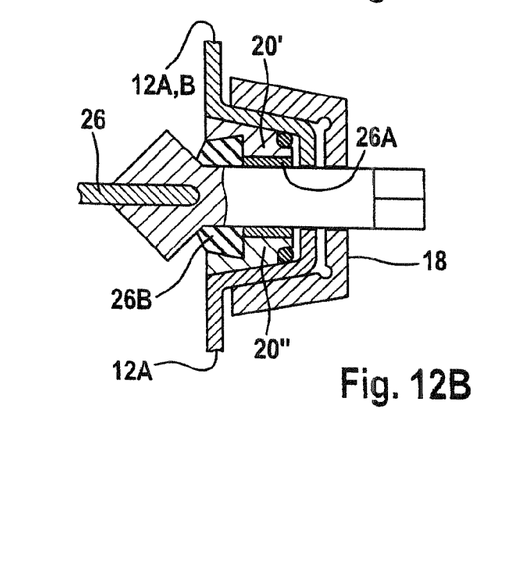
Figure 12C:
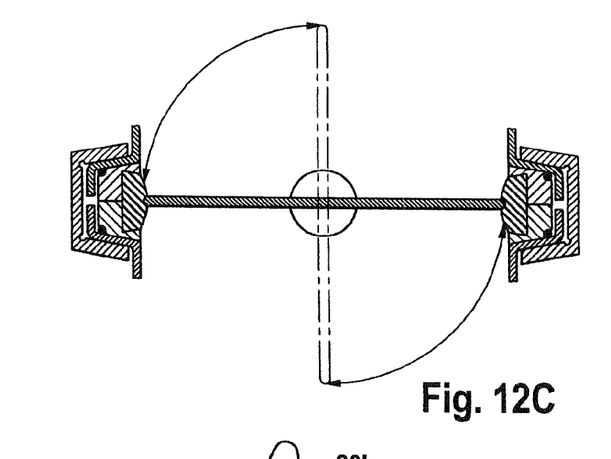
Figure 12D:
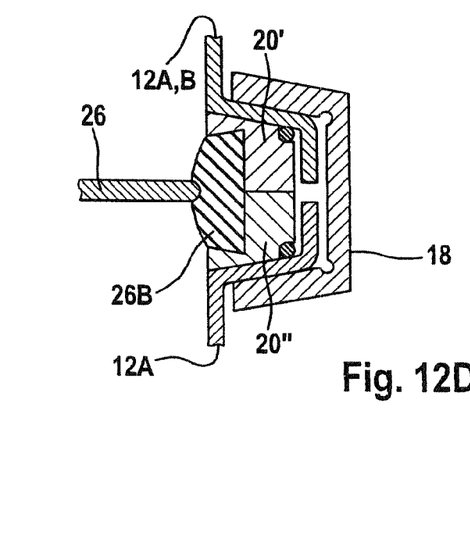

FIGS. 11A and 11B show a shape retaining ring 20 with a conforming end face profile similar to FIG. 7A and 7B, but for the attachment of one single outwardly located sealing ring 16. The bracing ring 18 contacts a portion of the wall elements 12A, 12B along bracing surface 18A.

According to FIGS. 12A through 12D, a container reinforcing shape retaining ring 20',20" according to the present invention can be axially divided into two parts along the midline so as to make it possible to mount a movable component, such as the throttle valve 26, which can serve, e.g., as a discharge valve for a conveyer. In this case, appropriately large recesses for mounting the bearing in the shape retaining ring are disposed in the region of the pivot bearing 26A. The large recesses accommodate a valve edge seal 26B.

LIST OF REFERENCE NUMBERS

10 Multilevel container
10A Container level
10B Container level
10C Container level
10D Container level
10E Container level
10F Wall of container
10G Bent region
12A Wall element
12B Bottom element
14 Beaded end face
14A End face
14B End face
14C Flange
14D Bent region
14E Reinforcement bridge
15 Crimp
16 Sealing ring
16A Sealing ridge
16B Sealing ridge
16C Connecting bridge
18 Bracing ring
18A Bracing surface
20 Shape retaining ring
20' Shape retaining ring
20" Shape retaining ring
20A Shape retaining surface
20B Shape retaining surface
20C Seal mount
22 Bottom
24 Funnel
24' Cyclone element
24" Discharge funnel
24A Funnel reinforcement
25 Intake stub
25A Outlet opening
26 Throttle valve
26A Pivot bearing
26B Valve edge seal
28 Filter element
28A Filter plate
30 Vacuum pump
30A Suction chamber
30B Suction opening
30C Suction line
30D Intermediate storage chamber The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

It is claimed:

1. A multilevel container comprising circumferentially continuous wall or bottom elements of sheet metal with radially outwardly beaded end faces being directed towards each other, which wall and bottom elements are disposed on top of each other on seal joints so as to seal the beaded end faces, the multilevel container also comprising a sealing ring and a bracing component that act on neighboring beaded end faces of neighboring elements, and a separate and independent shape retaining ring which reinforces the container and which is configured to engage and align said neighboring beaded end faces, wherein the shape retaining ring has shape retaining surfaces for said engagement and alignment, the shape retaining ring being disposed between said neighboring radially outwardly beaded end faces of the neighboring elements, each of said neighboring outwardly beaded end faces of said neighboring elements being abutted directly on and tightly braced against the shape retaining surfaces of the shape retaining ring from opposite sides thereof and abutted directly on and tightly braced against the sealing ring, the sealing ring tightly braced against a radially outmost surface of the shape retaining ring.

2. The multilevel container as claimed in claim 1, wherein the shape retaining ring has at least one recessed region for a seal mount.

3. The multilevel container as claimed in claim 1, wherein the shape retaining ring includes container components selected from the group consisting of funnel elements, bottoms, filter elements, throttle elements, closing elements, reinforcement elements, and combinations thereof.

4. The multilevel container of claim 1, wherein the bracing component acts on an external surface of each of said beaded end faces and an internal surface of each of said outwardly beaded end faces of the neighboring elements being abutted directly on and tightly braced against the shape retaining surfaces of the shape retaining ring from opposite sides thereof.

5. A multilevel container comprising circumferentially continuous wall or bottom elements of sheet metal with radially outwardly beaded end faces being directed towards each other, which wall and bottom elements are disposed on top of each other on seal joints so as to seal the beaded end faces, the multilevel container also comprising a sealing ring and a bracing component that act on neighboring beaded end faces of neighboring elements, wherein the bracing component acts on an external surface of each of said beaded end faces, and a separate and independent shape retaining ring which acts on an internal surface of each of said beaded end faces to engage and align said neighboring beaded end faces and reinforce the container, wherein the shape retaining ring has shape retaining surfaces for said engagement and alignment, the shape retaining ring being disposed between said neighboring radially outwardly beaded end faces of the neighboring elements, the internal surface of said each of said outwardly beaded end faces of the neighboring elements being disposed on and tightly braced against the shape retaining surfaces of the shape retaining ring from opposite sides thereof and abutted directly on and tightly braced against the sealing ring, the sealing ring tightly braced against a radially outmost surface of the shape retaining ring, wherein a minimum of one element has a radially externally disposed reinforcement bridge which extends approximately parallel to the wall of the container and which is disposed in one piece with the beaded end face on the radial outside of said beaded end face.

6. A multilevel container comprising:
a first cylindrical section defining a first end and a second end, and a circumferential wall extending between the first and the second end of the first section, the first end defining a radially outwardly extending first beaded end face having an internal surface and an external surface;
a second cylindrical section defining a first end and a second end, and a circumferential wall at least partially extending between the first and the second end of the second section, the second end defining a radially outwardly extending second beaded end face having an internal surface and an external surface, and the first and second beaded end faces being directed towards each other;

a shape retaining ring which reinforces the container, the shape retaining ring having a first sloped surface directly abutted between and tightly braced against the internal surface of the first beaded end face and the shape retaining ring having a second sloped surface directly abutted between and tightly braced against the internal surface of the second beaded end face, the firsts and second sloped surfaces being alignment surfaces to at least partially position and align the first and second beaded end faces, the shape retaining ring further including an inner face between the first and second sloped faces and an outer face opposite the inner face and between the upper and lower sloped faces; and a sealing ring disposed directly on and tightly braced against the shape retaining ring and disposed between and tightly braced against the first beaded end face and the second beaded end face.

7. The multilevel container of claim 6 further comprising a bracing ring disposed around the first section and the second section and contacting the external surface of the first beaded end face and the external surface of the second beaded end face.

8. The multilevel container of claim 7, wherein:
the bracing ring has a first bracing surface and a second bracing surface,
the first bracing surface contacting the external surface of the first beaded end face at a position radially outside the outer face of the shape retaining ring, and
the second bracing surface contacting the external surface of the second beaded end face at a position radially outside the outer face of the shape retaining ring.

9. The multilevel container of claim 7, wherein:
the bracing ring defines a first bracing surface and a second bracing surface,
the first bracing surface contacting the external surface of the first beaded end face at a position generally radially even with the outer face of the shape retaining ring, and
the second bracing surface contacting the external surface of the second beaded end face at a position generally radially even with the outer face of the shape retaining ring.

10. The multilevel container of claim 7, wherein:
the bracing ring has a first bracing surface and a second bracing surface,
the first bracing surface contacting the external surface of the first beaded end face at a position radially inside the outer face of the shape retaining ring, and
the second bracing surface contacting the external surface of the second beaded end face at a position radially inside the outer face of the shape retaining ring.

11. The multilevel container of claim 6 further comprising a second sealing ring disposed along the outer face of the shape retaining ring and between the first beaded end face and the second beaded end face.

12. The multilevel container of claim 6 wherein the shape retaining ring defines at least one indentation configured to receive and contact a region of the sealing ring.

13. The multilevel container of claim 6 wherein the shape retaining ring includes an extension extending radially inward from the inner face of the shape retaining ring.

14. The multilevel container of claim 6 wherein the first sloped face of the shape retaining ring and the first beaded end face are parallel with each other.

15. The multilevel container of claim 6 wherein the inner face of the shape retaining ring is substantially flush with an inner face of the circumferential wall of the first section and an inner face of the circumferential wall of the second section.

16. The multilevel container of claim 6 wherein a portion of the first beaded end face overlaps a portion of the second beaded end face.

17. The multilevel container of claim 6 wherein a gap is defined between a distal end of the first beaded end face and a distal end of the second beaded end face.

18. The multilevel container of claim 6, wherein:
the first sloped face of the shape retaining ring is tightly braced against the internal surface of the first beaded end face and is not parallel with the internal surface of the first beaded end face, and
the second sloped face of the shape retaining ring is tightly braced the internal surface of the second beaded end face and is not parallel with the internal surface of the second beaded end face.

19. The multilevel container of claim 6, wherein:
the first beaded end face includes a reinforcement bridge which is disposed on the radial outside of the first beaded end face and which extends approximately parallel to the wall of the first section toward the second beaded end face,
the second beaded end face includes a reinforcement bridge which is disposed on the radial outside of the second beaded end face and which extends approximately parallel to the wall of the second section toward the first beaded end face, and
the reinforcement bridge of one of the first and second reinforcement bridges overlaps a section of the other of the first and second reinforcement bridges.

* * * * *